United States Patent [19]

Tarca, deceased

[11] Patent Number: 5,372,455
[45] Date of Patent: Dec. 13, 1994

[54] OIL SPILL CONTAINMENT SYSTEM

[75] Inventors: Douglas Tarca, deceased, late of Queensland; June M. Tarca, administrator, Townsville, both of Australia

[73] Assignee: Oil Spill Containment Systems Pty. Ltd., Townsville, Australia

[21] Appl. No.: 64,178
[22] PCT Filed: Nov. 27, 1991
[86] PCT No.: PCT/AU91/00551
§ 371 Date: Jul. 26, 1993
§ 102(e) Date: Jul. 26, 1993
[87] PCT Pub. No.: WO92/09752
PCT Pub. Date: Jun. 11, 1992

[30] Foreign Application Priority Data

Nov. 27, 1990 [AU] Australia .................. PK3541

[51] Int. Cl.⁵ .................................... E02B 15/04
[52] U.S. Cl. ............................. 405/68; 405/66
[58] Field of Search ................. 405/63, 66–69, 405/72

[56] References Cited

U.S. PATENT DOCUMENTS

| | | | |
|---|---|---|---|
| 3,641,770 | 2/1972 | Fitzgerald . | |
| 3,888,086 | 6/1975 | Robertson et al. | 405/72 |
| 4,123,911 | 11/1978 | Finnigan et al. | 405/68 |
| 5,064,310 | 11/1991 | Sullivan | 405/69 |
| 5,066,164 | 11/1991 | Tomosy | 405/66 |
| 5,071,287 | 12/1991 | Wallace | 405/68 |
| 5,071,545 | 12/1991 | Ashtary | 405/66 X |
| 5,120,159 | 6/1992 | Smith | 405/66 |
| 5,135,325 | 8/1992 | Eddy | 405/66 |

FOREIGN PATENT DOCUMENTS

| | | |
|---|---|---|
| 2923083 | 12/1980 | Germany . |
| 1192909 | 8/1989 | Japan . |
| 1216481 | 12/1970 | United Kingdom . |
| 1278938 | 6/1972 | United Kingdom . |
| 2140401 | 12/1984 | United Kingdom . |

Primary Examiner—Randolph A. Reese
Assistant Examiner—John Ricci
Attorney, Agent, or Firm—Renner, Otto, Boisselle & Sklar

[57] ABSTRACT

A boom assembly is carried on board a vessel for automatic deployment around the vessel to contain an oil spill. The boom assembly comprises endless inflatable tubes supporting a skirt whose bottom edge is weighted by linear weight. The boom assembly is stored in uninflated folded form in an elongate capsule which serves as the deck handrail of the vessel. The tubes are connectable to a source of pressurized air via air lines. The capsule consists of hinged sections which are normally sealed. Upon inflation of the tubes, the seal is broken by expansion of the tubes and the hinged sections open to automatically deploy the boom assembly around the vessel.

12 Claims, 4 Drawing Sheets

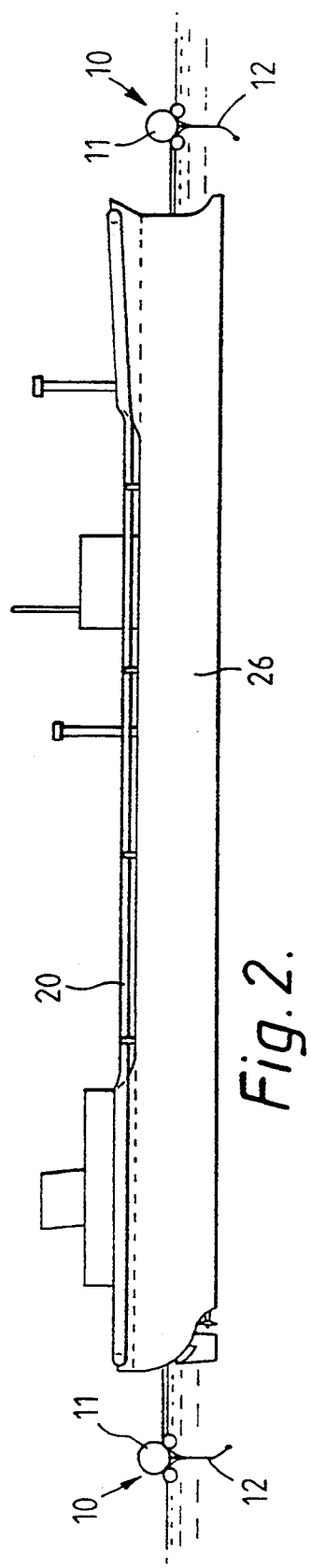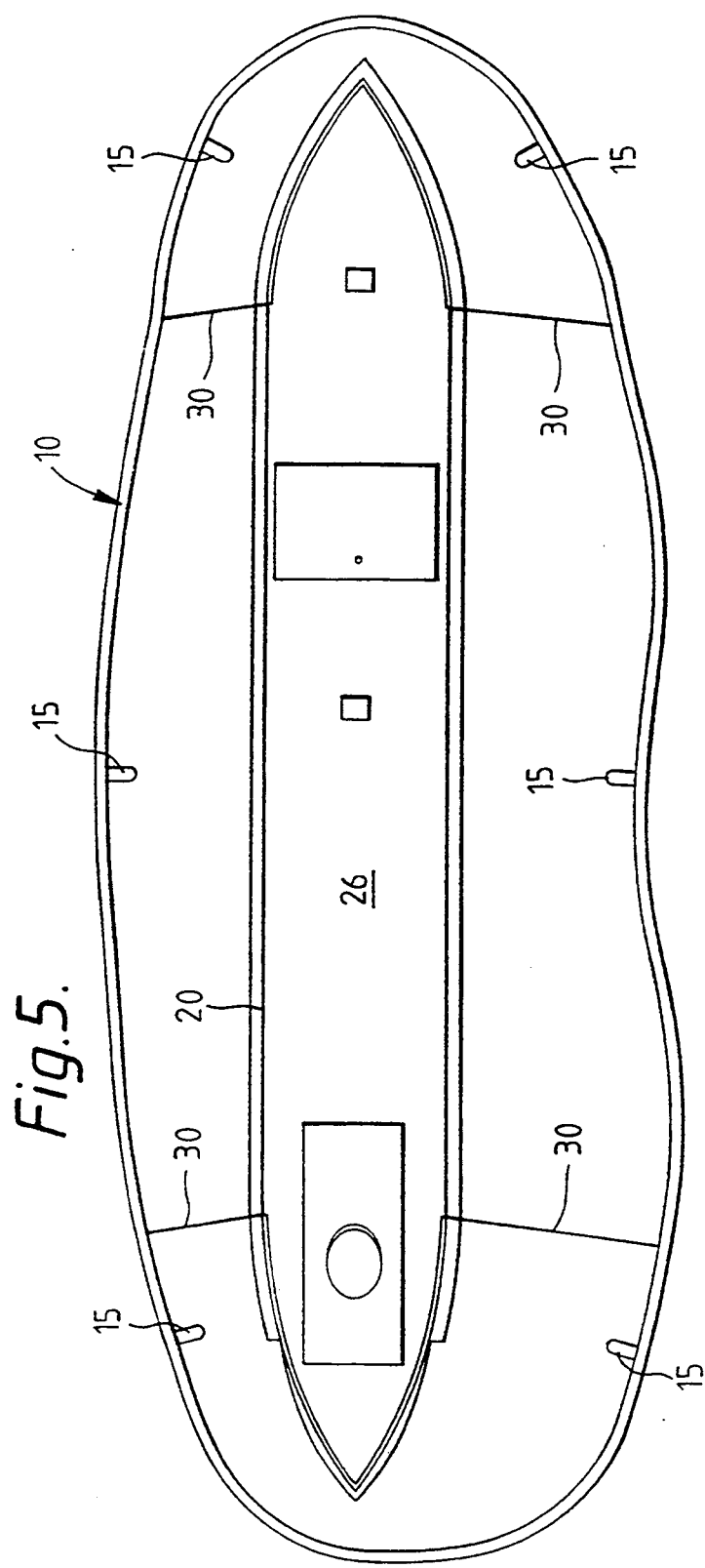

OIL SPILL CONTAINMENT SYSTEM

This invention relates to an improved spillage containment system, particularly but not solely suitable for the containment of oil spillages from vessels at sea or in waterways.

BACKGROUND OF THE INVENTION

The world's industrial nations continue to rely very heavily on energy produced from oil. As the major oil producing countries are not the major oil users, a great deal of the world's oil production has to be transported by sea. Tanker numbers, and more especially tanker sizes, have increased significantly during recent years and this has resulted in an increase in the number and severity of tanker accidents. There have been several recent examples of the disastrous consequences of an uncontrolled oil spill.

The majority of tanker spills occur in port during loading/unloading operations and are contained by shore-based facilities.

Tanker oil spills at sea are presently also treated by shore-based facilities. This practice involves significant delays whilst the equipment is being mobilised and transported to the accident site. Such delays allow the oil spill to grow larger in both volume of oil spilt and in surface area, making the spillage, and hence damage, progressively more difficult to contain.

Current oil spill control methods include the use of dispersants to break up the slick, sinking agents to sink the oil to the sea bed and oil booms to contain the spill and allow, at least, partial recovery of the oil. It is generally agreed within the oil industry, however, the removal of the oil, if possible, is the best method for dealing with oil spills and to achieve this the oil must be contained.

While the economic value of oil recovered after an oil spill cannot be disregarded this often represents only a small proportion of the full financial loss in a major incident. By far the most costly effect is that of environmental damage. Clean-up operations following an oil spill accident are extraordinarily expensive and are seldom entirely effective. Much damage is usually done before the clean-up operation can be initiated; the operation is generally heavily labour intensive and the efforts are seldom better than token in saving wildlife immediately affected - both flora and fauna. Further, many of the world's most highly regarded tourist attractions border on the sea and tourism operators face heavy financial losses as a consequence of any oil damage to these attractions.

To contain oil spills from marine vessels, it is known to carry an oil slick barrier in folded form on board the vessel (e.g. an oil tanker) for deployment around the vessel in the event of an oil spill. An example of a vessel-borne oil slick barrier can be found in German patent document no. DE2923083, which describes a vessel having an on-board oil slick barrier stored in folded form in an enclosure around the outside of the tanker hull. The enclosure is formed by one or more curved flaps pivotally connected to the hull. Upon opening of the flap(s), the oil slick barrier is jettisoned and inflated from compressed air cylinders which act as ballast for the barrier.

However, the known oil spill containment system has several inherent disadvantages. First, the construction of the enclosure on the outside of the hull of a new ship, or retrofitting the enclosure to an existing ship, is prohibitively expensive. Secondly, the location of the enclosure on the outside of the ship's hull interferes with the docking of the ship. Thirdly, the enclosure is not sealed and is subject to salt water penetration, with consequent corrosion problems. Fourthly, the enclosure is opened by hydraulic cylinders which, in addition to being subject to corrosion, are not necessarily fail-safe. Fifthly, the enclosure is not readily accessible for inspection and maintenance. Sixthly, the compressed air cylinders have a limited life and are subject to leakage. Finally, the oil barrier, once deployed and inflated, is subject to leakage and, once the gas in the cylinders has been exhausted, the barrier may sink.

It is an object of the present invention to provide an improved oil spill containment system which overcomes or ameliorates at least some of the disadvantages described above.

SUMMARY OF THE INVENTION

In one broad form, there is disclosed an improved spillage containment system adapted to be carried on, and deployed from, a vessel. The system comprises a boom assembly including an inflatable tubular member having a dependent barrier portion, the tubular member being buoyant when inflated to support the barrier portion when deployed in the water; container means, preferably located at or adjacent to the sides of the vessel, for storing the boom assembly in deflated form; and inflation means for at least partially inflating the tubular member while still in the container means, whereby the container means is caused to open by the inflation of the tubular member therein and automatically deploy the boom assembly at least partially, but preferably completely, around the vessel.

The system is typically adapted to contain oil spills from the vessel from which it is deployed.

The boom assembly typically comprises one or more juxtaposed inflatable tubes, which preferably are of continuous endless configuration. The boom assembly may alternatively be formed from individual discrete lengths joined to form a complete loop. In the preferred embodiment, the boom assembly comprises a central or main tube having two parallel smaller tubes at its lower sides. However, a single tube or any other suitable configuration of a plurality of tubes may be used. The main or larger tube in any configuration may suitably be provided with an internal diaphragm to assist the tube to maintain its shape.

The tubes can be manufactured from any suitable gas impervious, flexible material, such as natural or synthetic rubber, vinyl, or other plastics material. The material may suitably be reinforced for increased strength and to assist in maintaining design configuration.

Typically, the barrier portion is formed by a skirt extending longitudinally along the underside of the tube(s) and connected thereto. A linear weight, such as a chain, cable, or discrete rods, is suitably provided along the lower edge of the skirt to bias the skirt to a generally upright orientation and to act as ballast for the boom assembly. Preferably, the bottom edge of the skirt can be drawn so that the length of the lower edge of the skirt is shorter than the total length of the boom assemblage.

Advantageously, the boom assembly includes inwardly directed fenders to ensure that the boom will remain at a predetermined clearance from the vessel in the event that winds, currents, or other factors urge the boom towards that side of the vessel. As a minimum clearance will be maintained between the boom and the vessel, any spillage between the vessel and the boom will be contained, rather than spill over the boom. In the preferred embodiment, the fenders are inflatable tubes arranged generally orthogonally to the main boom tube and in fluid communication therewith so as to be inflated with the tube(s) of the boom.

The boom may include an auxiliary tube to distribute dispersant material, such as detergent, for dispersing or otherwise treating the contained oil.

Although the container means is preferably located at or adjacent the edge of the vessel above its deck, it may alternatively be located inboard of the ship's side but not in a position that would hinder or interrupt the deployment of the boom member. Further, the container means should not hinder or interfere with the operation, loading or unloading of the vessel.

The container means is preferably formed as the guard rail of the railing around the vessel. That is, the container means is constructed in the form of an elongate tubular capsule which serves as both the stowage capsule for the boom assembly as well as the deck guard rail.

The stowage capsule is typically fabricated from metal, or other suitable material, and is preferably of circular cross section (although other cross sections may be used).

In the preferred embodiment, the guard rail/capsule is split longitudinally into upper and lower hinged sections, the lower section being fixed to the posts of the ship's railing. The boom assembly is stored in uninflated form within the capsule, being folded longitudinally where required. Each inflatable tube of the boom assembly is connected by one or more air lines to a supply of pressurised gas, which may suitably be the vessel's dedicated inert gas system one or more compressor(s), fan(s) or other air pump(s). The joins between the upper and lower sections of the handrail/capsule are sealed by frangible seals to provide a watertight compartment within the capsule. The frangible seals may comprise tape, adhesive or any other suitable sealing material.

Preferably, the upper section of the capsule will be divided into segments which may open independently.

Deployment of the boom member is initiated either manually or automatically. For example, the boom deployment can be initiated by remote control signals from detectors or sensors placed at various locations within and outside the vessel.

Upon initiation of the boom deployment procedure, air is pumped automatically through the air line(s) to the deflated tubes of the boom stored in folded form in the handrail/capsule. Low pressure, high volume, air is supplied from fans, pumps or the vessel's dedicated inert gas system. Non-return valves are suitably provided in the air lines.

As the boom is inflated, it expands thereby exerting pressure on the internal walls of the capsule. When such pressure exceeds a predetermined limit, the seal between the upper and lower portions of the capsule will break, causing the upper portion to spring open about its hinge. Preferably, hold-back means are provided to retain the upper portion in its open position. The bottom portion is so arranged that upon opening of the capsule to a certain extent, the boom assembly will fall from the capsule under gravity and hence be deployed automatically around the vessel. The deployment of the boom member from the capsule may be gradual, progressing longitudinally along the capsule until the complete loop has been deployed about the vessel.

In order that the invention may be more fully understood and put into practice, a preferred embodiment thereof will now be described with reference to the accompanying drawings.

BRIEF DESCRIPTION OF THE DRAWINGS

FIG. 2 is a longitudinal section of the boom assembly of FIG. 1 deployed around a vessel (not to scale);

FIG. 5 is a schematic plan view of the boom assembly of FIG. 1 deployed about a vessel (not to scale);

DESCRIPTION OF THE PREFERRED EMBODIMENT

Figure 1:
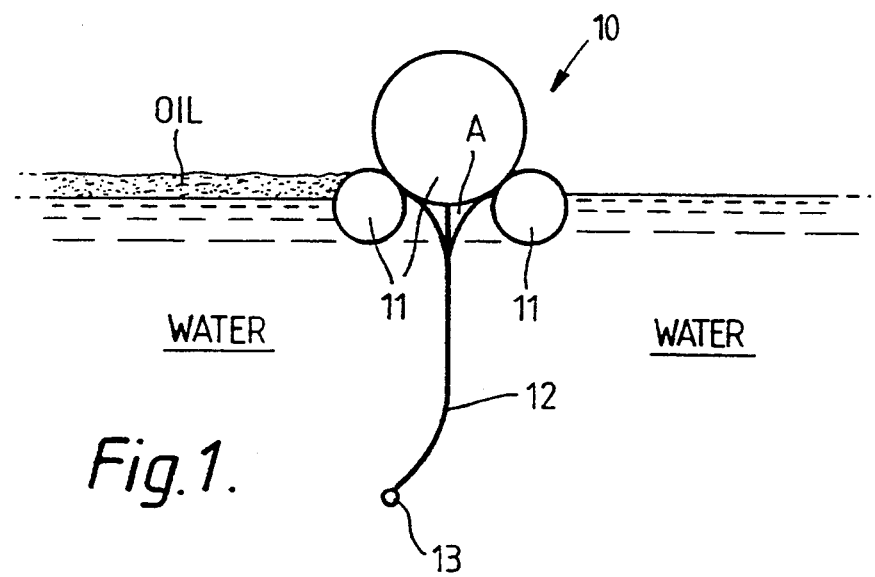
FIG. 1 is a schematic cross sectional view of the boom assembly of the oil spill containment system of the preferred embodiment in use.

As shown in FIG. 1, the oil spill containment system of the preferred embodiment comprises a boom assembly 10 formed by three inflatable tubes 11. The tubes 11 are suitably fabricated from a material impervious to oil products, and is preferably reinforced to provide adequate strength and to assist in maintaining the desired configuration. Typically, the tubes 11 are formed of a strong flexible oil resistant plastic fabric which is welded and sealed to form the tubes.

The three inflatable tubes 11 which make up the boom 10 consist of a central main tube, and two supporting tubes fixed to the lower sides of the main tube. This configuration provides stability in strong winds and rough seas, while maximising the height of the boom 10 and hence the depth of the oil spill which the boom is able to contain.

The boom assembly 10 also includes a continuous depending barrier skirt 12 extending longitudinally under the tubes 11 and which is provided with suitable means for attachment to the tubes 11. Viewed in cross-section (as in FIG. 1), the top of the skirt 12 is trifurcated and joined to the tubes 11 along three respective longitudinal joins. The trifurcated portion of the skirt forms, in cross-section, a triangular cavity marked A in FIG. 1. The outer side of the skirt (i.e., the side away from the oil) is slotted to allow water to enter cavity A and serve as extra ballast to steady the boom assembly against wind and wave action. The top of the skirt 12 may alternatively be bifurcated and connected to both sides of the central tube.

The barrier skirt 12 may suitably be fabricated from the same material as the tubes 11 and may even be formed integrally therewith. A linear weight, such as a heavy chain 13, extends along the bottom edge of the barrier skirt 12 to bias the skirt 12 to a generally vertical orientation, and also acts as ballast to maintain the boom 10 in the desired upright configuration in times of high wind or rough seas.

The length of chain 13 is preferably somewhat shorter in total length than the tubes 11. This allows some build-up in chain tension and thereby prevents the skirt 11 from being carried in the direction of tidal and current flow which may allow oil to escape under the boom. The skirt 12 may vary in depth and in method of application of the weight to its lower edge.

In the preferred embodiment, the boom assembly 10 is carried on board a vessel for deployment therefrom to contain an oil spill from the vessel. The boom is preferably of continuous endless design and of sufficient length to surround the vessel 26 at a predetermined minimum spacing therefrom, as shown in FIG. 5. Alternatively, the boom assembly 10 may comprise several discrete longitudinal sections which are joined, or can be joined, to form a containment ring around the vessel 26.

The length of continuous loop of boom assembly is determined by the length of the tanker/vessel at maindeck and the maximum carrying capacity in tonnes/litres/barrels and will be fixed for any given vessel. It will also be dependent on the depth of oil permitted within the deployed boom assembly. A ratio of three times the perimeter length of the vessel at main exposed deck is a reasonable estimate, but this length may be selected to suit the particular application.

The boom assembly 10 is stored with the tubes 11 in uninflated form, together with the skirt 12 and weight 13, in folded form in sealed case, housing or capsule 20 at the gunwale or outer periphery of the deck of the vessel 26 to facilitate quick deployment of the boom in the event of an oil spill from the vessel. However, the boom 10 is stored within the boundary of the vessel defined by its hull so as not to interfere with docking.

In the preferred embodiment, the boom assembly 10 is stored within a sealed elongate tubular capsule 20 which may also serve as the guard rail around the periphery of the deck of the vessel. (Suitable provision is made for gangways, access ladders and discharge manifold supports).

As the boom assembly 10 is longer than the guard rail, the boom assembly is folded longitudinally within the guard rail, particularly at the bow and stern of the vessel 26. The capsule 20 may suitably be of greater diameter at the bow and stern to accommodate more length of folded boom at the ends of the vessel. However, the capsule 20 can have a substantially smaller and less obtrusive profile along the port and starboard sides of the vessel.

The preferred mounting position is on the outboard side of the vessel's guard rails at ship-side at a height that is compatible with deck fittings and services. In the region of the bows, installation is on the inboard side of the forecastle bulwarks at a height that would protect the capsule 20 while still permitting the boom assemblage to deploy. At the stern, the capsule 20 is installed in a position and at a height that will promote deployment and allow access to all ship services.

Figure 3:
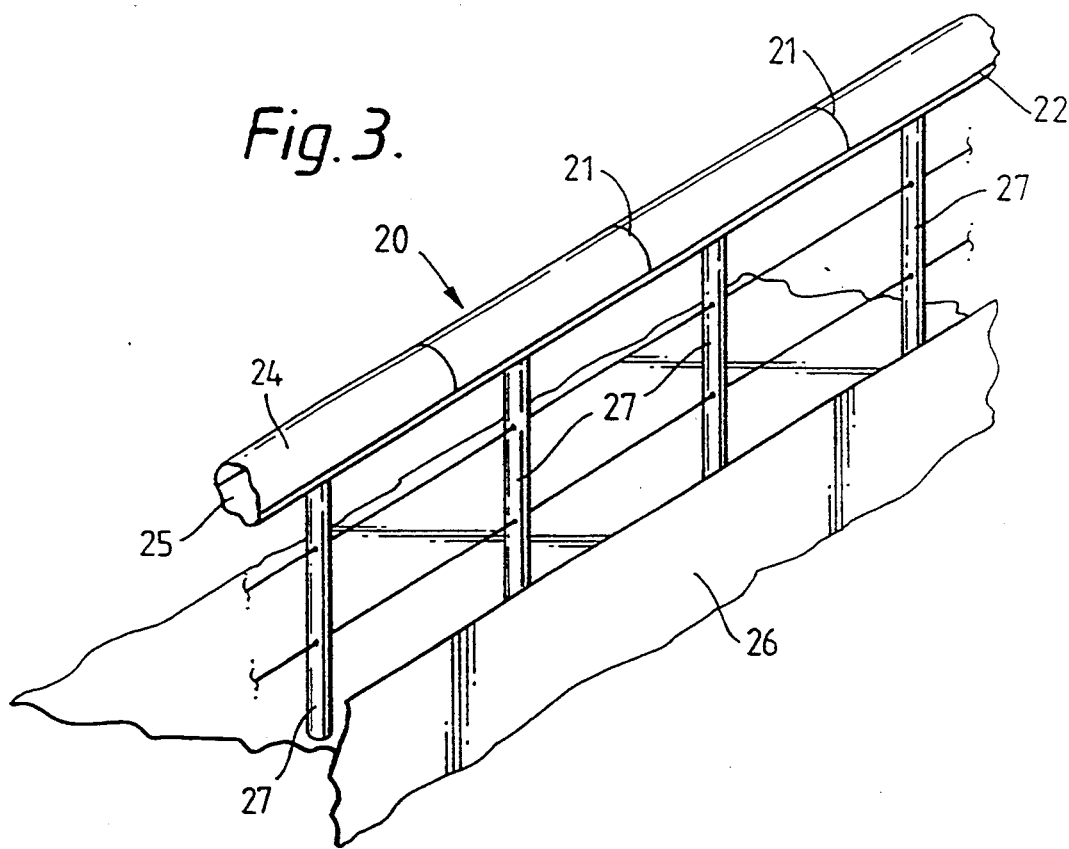
FIG. 3 is a perspective view of part of the stowage arrangement for the boom assembly of FIG. 1.
Figure 4:
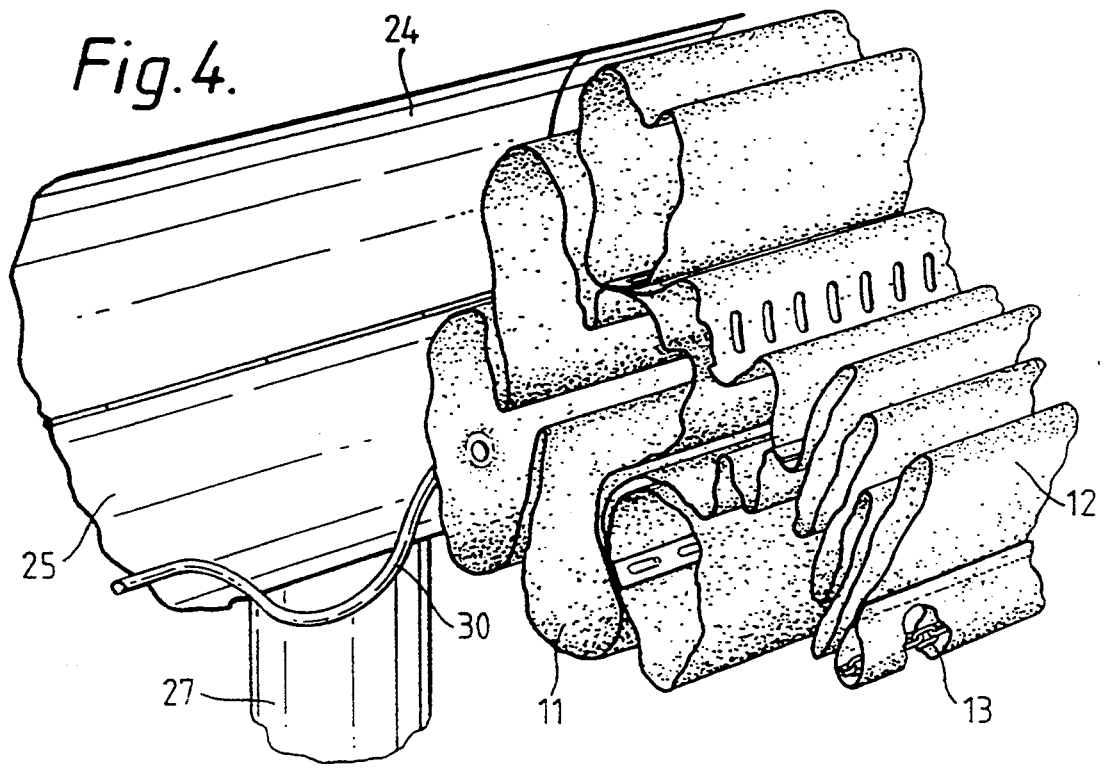
FIG. 4 is a perspective view of part of the stowage arrangement of FIG. 3 during deployment of the boom assembly.

Referring to FIGS. 3 and 4, the preferred stowage capsule 20 for the boom assembly 10 comprises an elongate tubular guard rail which is divided longitudinally into upper and lower halves 24, 25 respectively. The bottom half 25 is mounted securely to the top of the posts 27 of the vessel's side rail, and the upper half 24 is divided longitudinally at 21 into segments. Each upper half segment 24 is hinged to the lower half 25 along the inner longitudinal join 23. The bottom portions 25 may be fitted with air supply points connecting air lines 30 to a ducting system from blower fans (not shown).

When the boom assembly 10 is stored in its uninflated, longitudinally folded, form within the stowage capsule/guard rail 20, the join 22 between the upper and lower halves 24, 25 is sealed, e.g. by frangible sealing tape or the like. The hinge join 23 is also sealed so as to be watertight. In this manner, the boom assembly 10 is housed in a sealed environment when not deployed, and is therefore protected from corrosion and harsh elements, and circulation of air, and retains its integrity and security.

The tubes 11 of boom assembly 10 are connected by one or more suitable air lines 30 to means for supplying a relatively large volume of air at relatively low pressure. In the preferred embodiment, the air line(s) 30 are connected, via a ducting system, to one or more air compressors or blower fans strategically placed on the vessel. The ducting system may be incorporated in the capsule 20 or may be deck mounted either above deck or on the underside thereof. The air lines 30 carrying air from the ducting system to the tubes 11 are folded and stowed in capsule 20. These air lines are of such length to permit the boom 10 to be deployed a sufficient distance from the vessel to contain the oil spill.

Some vessels, such as oil tankers, possess a dedicated inert gas system which maintains gas at a predetermined pressure in the holds of the tanker. If the vessel is provided with its own pressurised gas system, such system can be activated and diverted to inflate the boom, or to serve as a back-up system.

Air pressure within the boom assembly 10 will be sufficient to keep all tubes 11 fully inflated. Pressure is maintained by incorporating appropriate pressure relief valves in the boom assembly. To ensure that the air supply is maintained in the event of one or all air lines 30 becoming disconnected or damaged at any time during the deployment, non-return valves are fitted to the boom assembly at all air inlet points. All fittings required to effect the controls outlined above should be manufactured from material compatible with fabrics used in the manufacture of the boom assembly.

The air supply system, as previously described, is preferably of sufficient capacity to inflate and deploy the boom assembly within 15 minutes of activation.

In the event of the vessel hitting an obstruction and rupturing a hold, or as a result of any other spillage of oil or other material from the vessel, a control system, which preferably has a monitoring panel in the wheelhouse and/or the machinery control room, is activated either manually or automatically, to inflate the tubes 11 of the boom 10 stored in the guard rail capsule 20. Manual operation can be simply by push button, while automatic operation can be triggered by remote control signals from any part of the vessel, or from detectors in or outside the vessel. The control of start-up of the supply air fans may be instantaneous for all fans, or may be delay controlled for progressive start-up. One major supply fan may be ducted to all supply points or air lines connected to the tubes 11 of the stowed boom assembly.

As the tubes 11 of the folded boom 10 are inflated, the expanding tubes exert pressure on the inner walls of the hinged halves 24, 25 of the handrail capsule 20. Once the pressure exceeds a predetermined level, the frangible seal across the join 22 between the two hinged halves 24, 25 will break, allowing the upper half 24 of each segment of the capsule 20 to open as depicted in FIG. 4. The capsule 20 therefore opens progressively in segments along its length. The bottom half 25 of the capsule 20 is so arranged that after the upper half 24 of each segment has opened to a certain degree, the inflating boom therein will drop automatically under gravity to the water around the vessel, as shown in FIG. 5.

The continued connection of air lines 30 from the air supply to the boom 10 ensures that the tubes 11 of the boom will be inflated to the required degree, and will remain inflated despite slow leakages.

Deployment of the boom assembly 10 is therefore automatic after inflation is initiated, thus relieving crew from any necessary involvement and permitting them to maintain other damage control operations.

To ensure that the upper half 24 of each segment of the capsule 20 remains in the open position once it has been urged open by the inflating tubes of the boom, an automatic hold-back mechanism is fitted to the capsule. Such hold-back system may be a ratchet mechanism incorporated in the hinge arrangements between the upper and lower halves 24, 25 of the capsule 20.

Figure 6:
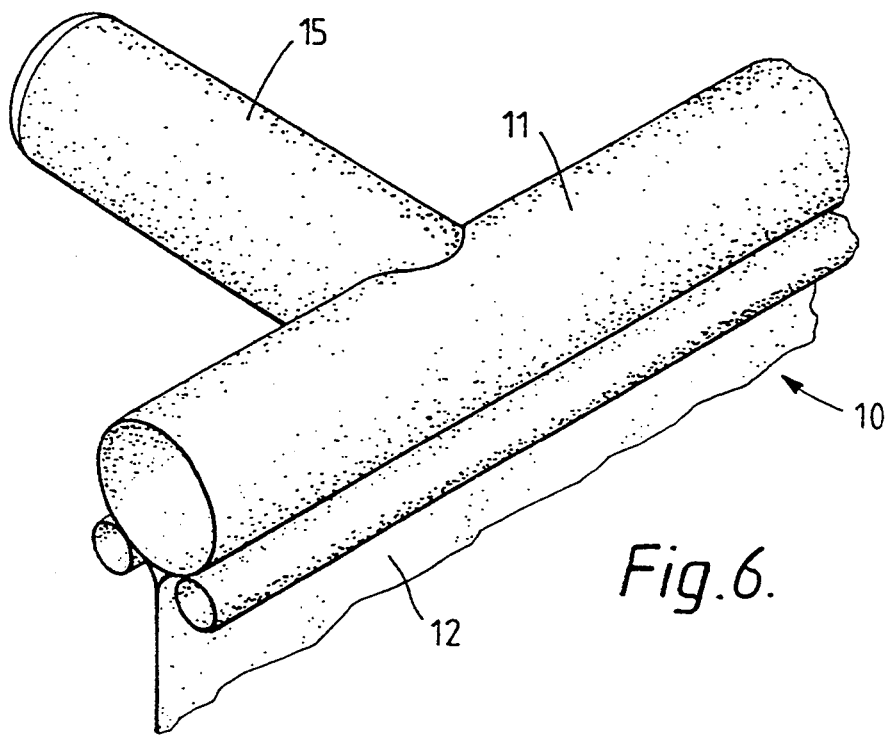
FIG. 6 is a perspective view of part of the boom assembly of FIG. 1 showing a fender formation thereon.
Figure 7:
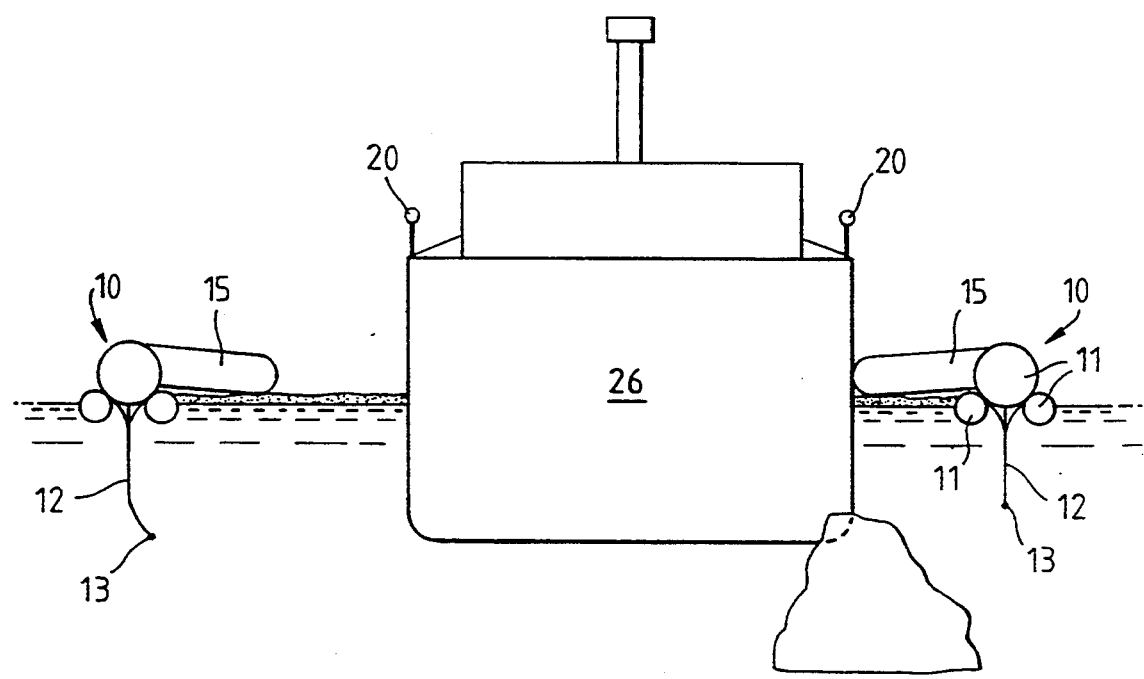
FIG. 7 is a schematic sectional elevation view of the boom assembly of FIG. 1 in use.

In high wind, tide or current conditions, the boom assembly 10 may be blown or pushed against the hull on one side of the vessel, and any oil between the vessel and the boom on that side may spill over to the outside of the boom. To obviate this problem, a plurality of fenders 15 are provided on the boom 10 assembly. As shown in FIGS. 6 and 7, the fenders 15 comprise inflatable tubes of preselected length extending generally orthogonally and inwardly from the boom assembly 10, at spaced locations along the boom. In the preferred embodiment, the fenders 15 are in fluid communication with at least the main tube 11 so that upon inflation of the tube 11, the fenders 15 will also be inflated automatically.

Thus, in a situation where the currents or winds push the boom assembly 10 against one side of the stricken vessel, one or more of the fenders 15 will maintain the boom assembly 10 spaced from that side of the vessel so that any oil between the boom and the vessel will be retained within the boom assembly, as shown diagrammatically in FIG. 7. (The boom assembly 10 has been shown on a greatly enlarged scale in FIG. 7 for explanatory purposes). The depending skirt 12 below the tubes 11 will also prevent the oil from escaping under the boom.

It will be apparent to those skilled in the art that the abovedescribed oil spill containment system has several significant advantages, including (i) the oil boom can be stored unobtrusively in an elongate capsule which can simultaneously function as the deck guard rail, (ii) the positioning of the capsule does not interfere with docking, loading/unloading or other operations of the vessel, (iii) the boom assembly is of stable configuration with substantial height above water level (iv) the boom is stored securely in a sealed watertight container and is therefore protected from corrosion and harsh elements, (v) the deployment of the boom is automatic and failsafe, (vi) the deployment may be initiated either manually or automatically, (vii) the boom can be retrofitted to a vessel without significant structural modifications to the vessel, (viii) installation of the oil spill containment system is relatively simple and low cost, (ix) the configuration of the plural tubes forming the boom assists in stabilising the boom, and the boom will remain buoyant so long as one of the tubes remains inflated, (x) the fenders ensure that a minimum space is maintained between the boom and the vessel in all cases thereby preventing spillover of oil, and (xi) the oil spill is contained within the boom assembly for recovery.

The foregoing describes only one embodiment of the invention, and modifications which are obvious to those skilled in the art may be made thereto without departing from the scope of the invention as defined in the following claims.

For example, the number and configuration of the tubes 11 forming the boom 10 can be varied. Furthermore, although the capsule 20 is preferably in the handrail position, it may alternatively be located around the gunwales of the vessel, i.e along the edge of the deck.

It is claimed:

1. An improved spillage containment system adapted to be carried on, and deployed from, a ship or similar marine vessel; the system comprising an elongate boom assembly comprising at least a first inflatable tubular member, and a dependent barrier member connected therealong, the tubular member being buoyant when inflated to thereby support the barrier member when the boom assembly is deployed in water;

container means mounted on the vessel for storing the boom assembly with the tubular member in deflated form; and inflation means for inflating the tubular member while it is still in the container means, whereby the container means is caused to open by the expansion of the tubular member therein as a result of its inflation, and thereby automatically deploy the boom assembly around the vessel.

2. An improved spillage containment system as claimed in claim 1, further comprising at least one air line for connecting the tubular member to the inflation means, the air line(s) being of sufficient length to maintain fluid communication between the tubular member and the inflation means after the boom assembly has been deployed around the vessel.

3. An improved spillage containment system as claimed in claim 2, wherein the inflation means comprises air pump means connected to the air line(s) via ducting.

4. An improved spillage containment system as claimed in claim 1 wherein the vessel has a hull and a deck thereon, and further wherein the container means is an elongate tubular member located above the deck and around the periphery of the vessel but within an envelope defined by the hull of the vessel.

5. An improved spillage containment system as claimed in claim 1 wherein the boom assembly further comprises a pair of inflatable tubular members of smaller diameter than the first tubular member and juxtaposed with the first tubular member at opposed lower sides thereof when inflated.

6. A spillage containment system as claimed in claim 5, further comprising a plurality of inflatable fender members, each fender member being connected to the first tubular member and orientated generally orthogonally thereto when inflated and deployed.

7. An improved spillage containment system as claimed in claim 1 wherein the boom assembly is of endless configuration.

8. A spillage containment system as claimed in claim 7, wherein the barrier member comprises a skirt-like portion having weight means at its lower edge for biasing the skirt portion in a generally vertical orientation when deployed in water.

9. A spillage containment system as claimed in claim 7, wherein the container means comprises an elongate tubular capsule extending around a substantial portion of the periphery of the deck of the vessel, the capsule being divided longitudinally into a bottom portion mounted to the vessel, and a top portion hinged to the bottom portion.

10. A spillage containment system as claimed in claim 9, wherein the top portion is segmented into separate sections along the length of the capsule.

11. A spillage containment system as claimed in claim 9, wherein the free longitudinal edges of the top and bottom portions of the capsule form a longitudinal joint extending along the length of the capsule, the joint being sealed by a frangible sealing member.

12. A spillage containment system as claimed in claim 9, wherein the capsule serves as a guard rail along at least a portion of the deck of the vessel.

* * * * *